United States Patent

Sadeck

(10) Patent No.: US 6,520,453 B1
(45) Date of Patent: Feb. 18, 2003

(54) ROUGH TERRAIN CARGO PARACHUTE ASSEMBLY

(75) Inventor: James E. Sadeck, East Freetown, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/942,283

(22) Filed: Aug. 27, 2001

(51) Int. Cl.⁷ .............................................. B64D 17/02
(52) U.S. Cl. ....................... 244/145; 244/142
(58) Field of Search ................. 244/142, 145, 244/146, 147, 149, 151 B, 152

(56) References Cited

U.S. PATENT DOCUMENTS

| | | | | |
|---|---|---|---|---|
| 1,194,691 A | * | 8/1916 | Adams | 244/145 |
| 2,358,798 A | * | 9/1944 | Forbes | 244/145 |
| 2,566,585 A | * | 9/1951 | Smith | 244/152 |
| 2,703,212 A | * | 3/1955 | Heinrich | 244/152 |
| 3,298,641 A | * | 1/1967 | Heinrich | 174/48 |
| 3,420,478 A | * | 1/1969 | Ferguson | 244/142 |
| 3,474,990 A | * | 10/1969 | Flatau | 244/145 |
| 3,493,199 A | * | 2/1970 | Flatau | 244/145 |
| 3,603,536 A | | 9/1971 | Dochow | 244/142 |
| 3,756,547 A | * | 9/1973 | Snyder et al. | 244/152 |
| 3,780,970 A | * | 12/1973 | Pinnell | 244/142 |
| 4,253,627 A | * | 3/1981 | Matsuo | 244/145 |
| 4,588,149 A | * | 5/1986 | Gold | 244/145 |
| 4,752,050 A | * | 6/1988 | Johnson | 244/149 |
| 4,778,131 A | * | 10/1988 | Calianno | 244/145 |
| 4,813,636 A | * | 3/1989 | Lindgren | 244/152 |
| 4,834,323 A | * | 5/1989 | Reuter | 244/145 |
| 5,037,042 A | * | 8/1991 | Calianno | 244/145 |
| 5,209,436 A | * | 5/1993 | Lee | 244/152 |
| 5,839,695 A | * | 11/1998 | Puskas | 244/142 |
| 6,276,638 B1 | * | 8/2001 | Parker et al. | 244/142 |

* cited by examiner

Primary Examiner—Charles T. Jordan
Assistant Examiner—Stephen A Holzen
(74) Attorney, Agent, or Firm—Vincent J. Ranucci

(57) ABSTRACT

A rough terrain cargo parachute assembly includes a canopy defining four tubular sleeves equidistantly disposed on an external surface of the canopy when the canopy is deployed, each of the sleeves having an opening at a hem line of the canopy and being in communication with an interior of the canopy, the canopy hem line, less the sleeves, being substantially round, and a suspension line connected to the canopy at each point wherein one of the sleeve openings is adjacent the canopy hem line.

7 Claims, 3 Drawing Sheets

ROUGH TERRAIN CARGO PARACHUTE ASSEMBLY

STATEMENT OF GOVERNMENT INTEREST

The invention described herein may be manufactured and used by the U.S. Government for governmental purposes without the payment of any royalty thereon.

BACKGROUND OF THE INVENTION

1. Field of the Invention

The invention relates to cargo parachutes and is directed more particularly to rough terrain parachutes for air dropping supplies to smoke jumpers and other wildland firefighters.

2. Description of the Prior Art

It is known to supply and resupply wildland firefighters with fire-fighting equipment by way of air drops. Such drops often are made from lower altitudes, at times around 100 feet. Accordingly, fast and reliable opening of the parachute is required. In the course of such drops, parachutes used often become entangled in trees and present dangers in recovering heavy loads snagged in trees. Thus, a minimum of parachute-suspension lines is desirable to reduce entanglements. It is further desirable for the parachute to provide a stable descent, but to rapidly close upon initial impact with timber, to enhance payload velocity and increase penetration through the timber.

SUMMARY OF THE INVENTION

An object of the invention is, therefore, to provide a cargo parachute suitable for use in rough terrain.

A further object of the invention is to provide such a parachute having only four suspension lines, which opens quickly and reliably, and which quickly deflates upon impact.

Still further objects are to provide such a parachute as is light weight, easily packed, of relatively small pack size, and which is inexpensive to make.

With the above and other objects in view, as will hereinafter appear, a feature of the present invention is the provision of a rough terrain cargo parachute assembly including a canopy defining four tubular sleeves equidistantly disposed on an external surface of the canopy when the canopy is deployed, each of the sleeves having an opening at a hem line of the canopy and being in communication with an interior of the canopy, the canopy hem line, less the sleeves, being substantially round, and a suspension line connected to the canopy at each point wherein one of the sleeve openings is adjacent the canopy hem line.

In accordance with a further feature of the invention, there is provided a method for making a rough terrain parachute, the method including the steps of providing a sheet of parachute material in a square configuration, cutting symmetrical two-sided openings into each corner of the sheet to provide eight outwardly extending points in the sheet, sewing load-bearing reinforcing lines from each of the points to an opposite point to provide four load-bearing lines extending across the canopy edge-to-edge, providing a loop at each end of the reinforcing lines, and attaching a suspension line to each of two adjacent ones of the loops, thereby to affix four suspension lines to the canopy and to form four sleeves on the canopy, each of the sleeves having an opening at a hem of the canopy and being in communication with an interior of the canopy when the canopy is deployed.

The above and other features of the invention, including various novel details of construction and combinations of parts, and method steps will now be more particularly described with reference to the accompanying drawings and pointed out in the claims. It will be understood that the particular device and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
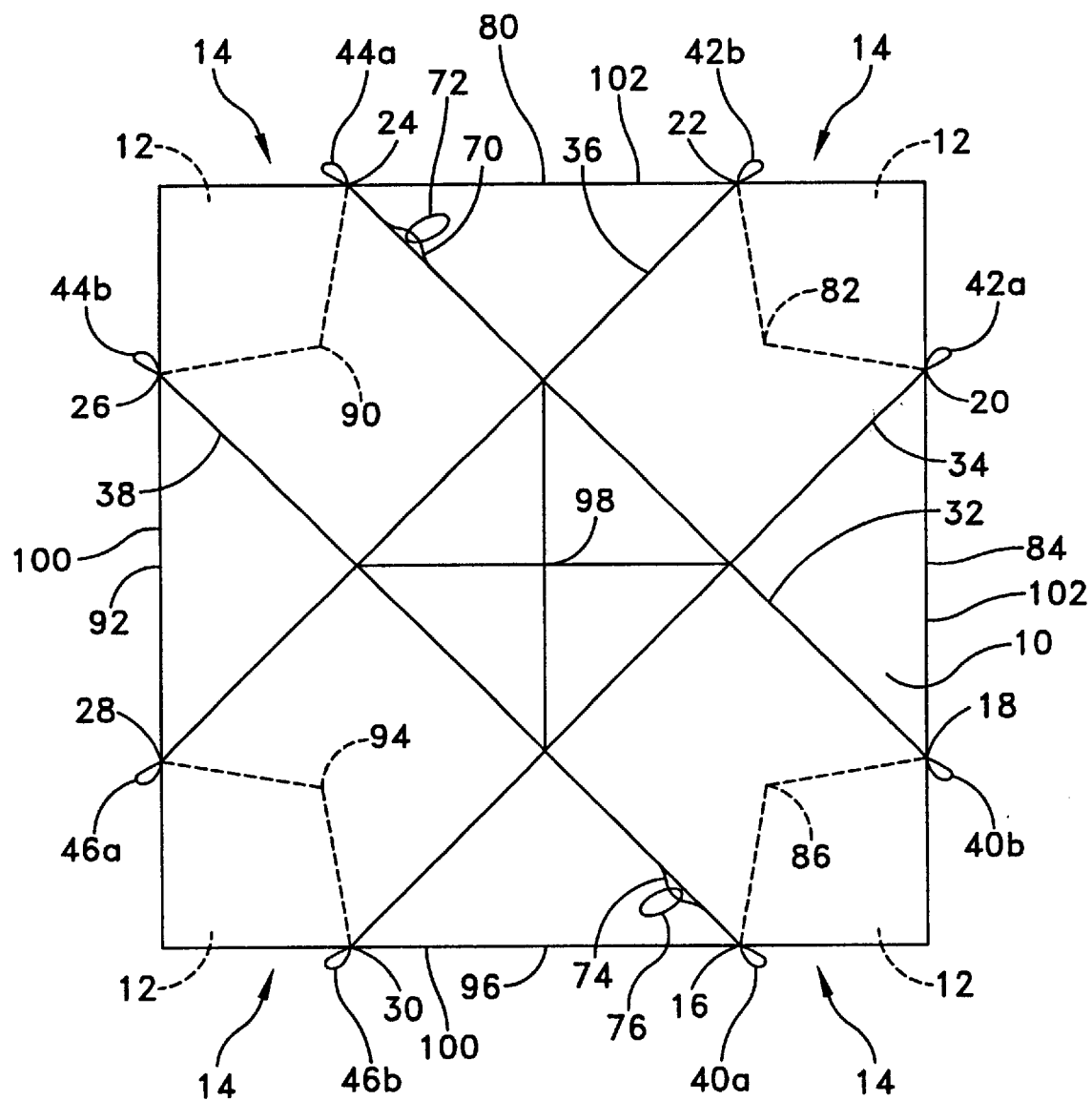
FIG. 1 is a planar view of a sheet formed for a parachute canopy and illustrative of an embodiment of the invention.

Referring to FIG. 1, it will be seen that to make one form of parachute illustrative of an embodiment of the invention, there is provided a sheet 10 of parachute canopy material in a square configuration.

Two-sided symmetrical openings 12, all of the same size and configuration, are cut from corner portions 14 of the sheet 10, and are shown in phantom in FIG. 1. The openings 12 provide the sheet 10 with a configuration including eight outwardly extending points 16, 18, 20, 22, 24, 26, 28 and 30.

Load-bearing reinforcing lines 32, 34, 36, 38 are sewn into the panel 10 from point to opposite point. More specifically, as shown in FIG. 1, reinforcing line 32 extends from point 18 to point 24, line 34 from point 20 to point 30, line 36 from point 22 to point 28, and line 38 from point 16 to point 26. Each end of each reinforcing line is provided with a loop. The loops 40a 40b; 42a, 42b; 44a, 44b; and 46a, 46b are respectively adjacent the points 16, 18; 20, 22; 24, 26; and 28, 30.

Figure 2:
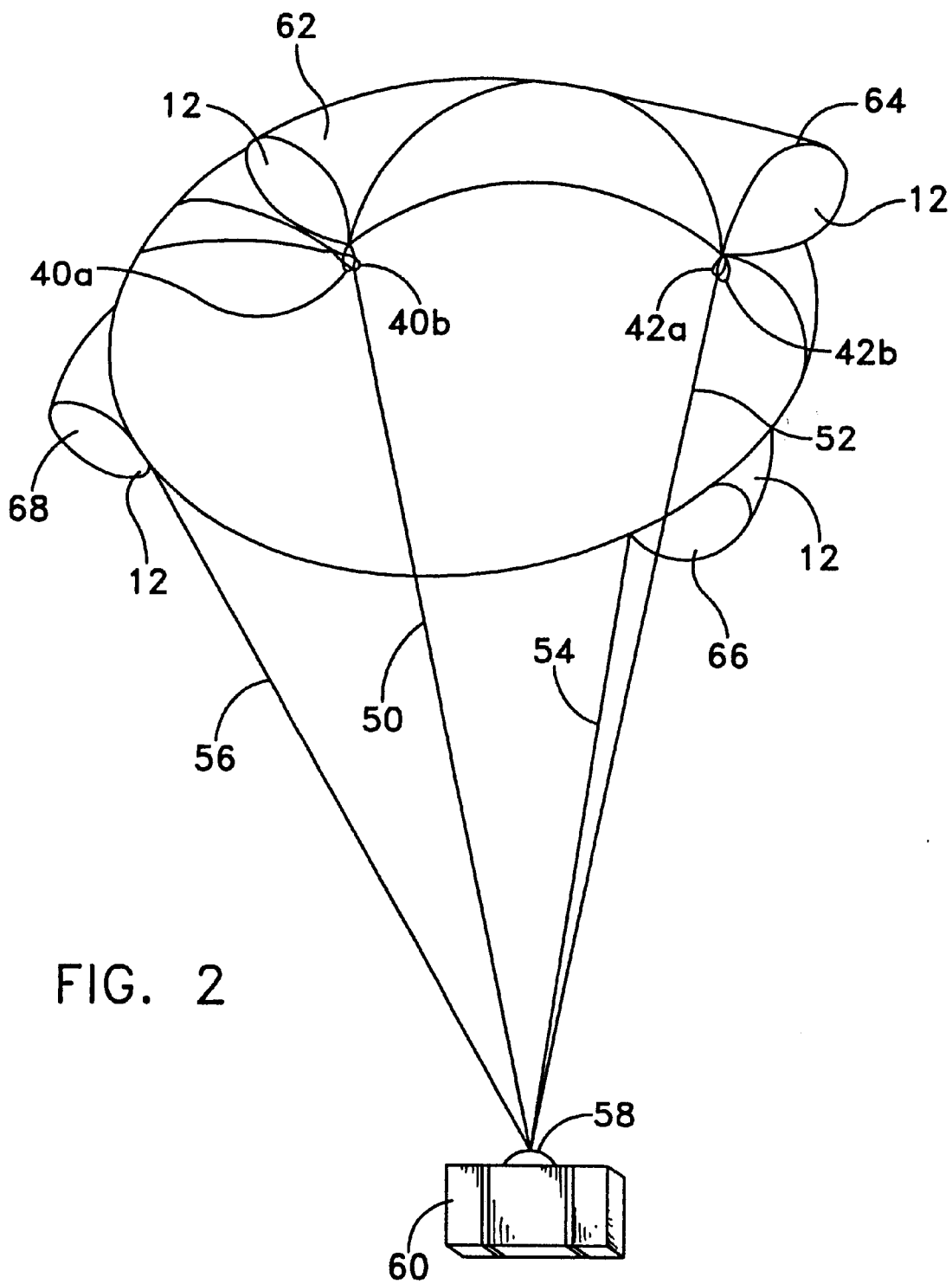
FIG. 2 is a perspective view of a parachute canopy formed from the sheet of FIG. 1, and other components.

Each pair of loops as, for example, loops 40a, 40b, is attached to a suspension line as, for example, suspension line 50, as shown in FIG. 2. The suspension line 50 and suspension lines 52, 54 and 56 converge and support a harness 58 which, in turn, is adapted to support fire-fighting gear, or the like, 60, as shown in FIG. 2.

When the canopy is deployed each of the openings 12 and its loops 40a, 40b . . . 46a, 46b, respectively, form tubular sleeves 62, 64, 66 and 68, which function as ram nozzles which assist in early opening and inflation. Once the parachute is completely open, and a steady state decent has been achieved, air flow through the sleeves 62, 64, 66 and 68 is reversed and the sleeves serve as vents. There is no central vent of the sort customarily found in round canopies. This directed venting of the canopy eliminates the spilling of air from under the canopy hem, thereby reducing or eliminating large amplitude oscillation of the parachute and payload. Elimination of oscillation reduces the likelihood of entanglement in branches of timber.

When the parachute pay load strikes timber, the axial deflection of the suspension line causes immediate deformation of the canopy, which reduces drag, increases payload velocity, and increases penetration through timber. Thus, the chances of the payload reaching ground are improved, thereby reducing the likelihood of having to face the dangers involved in recovering payloads lodged in trees.

Figure 3:
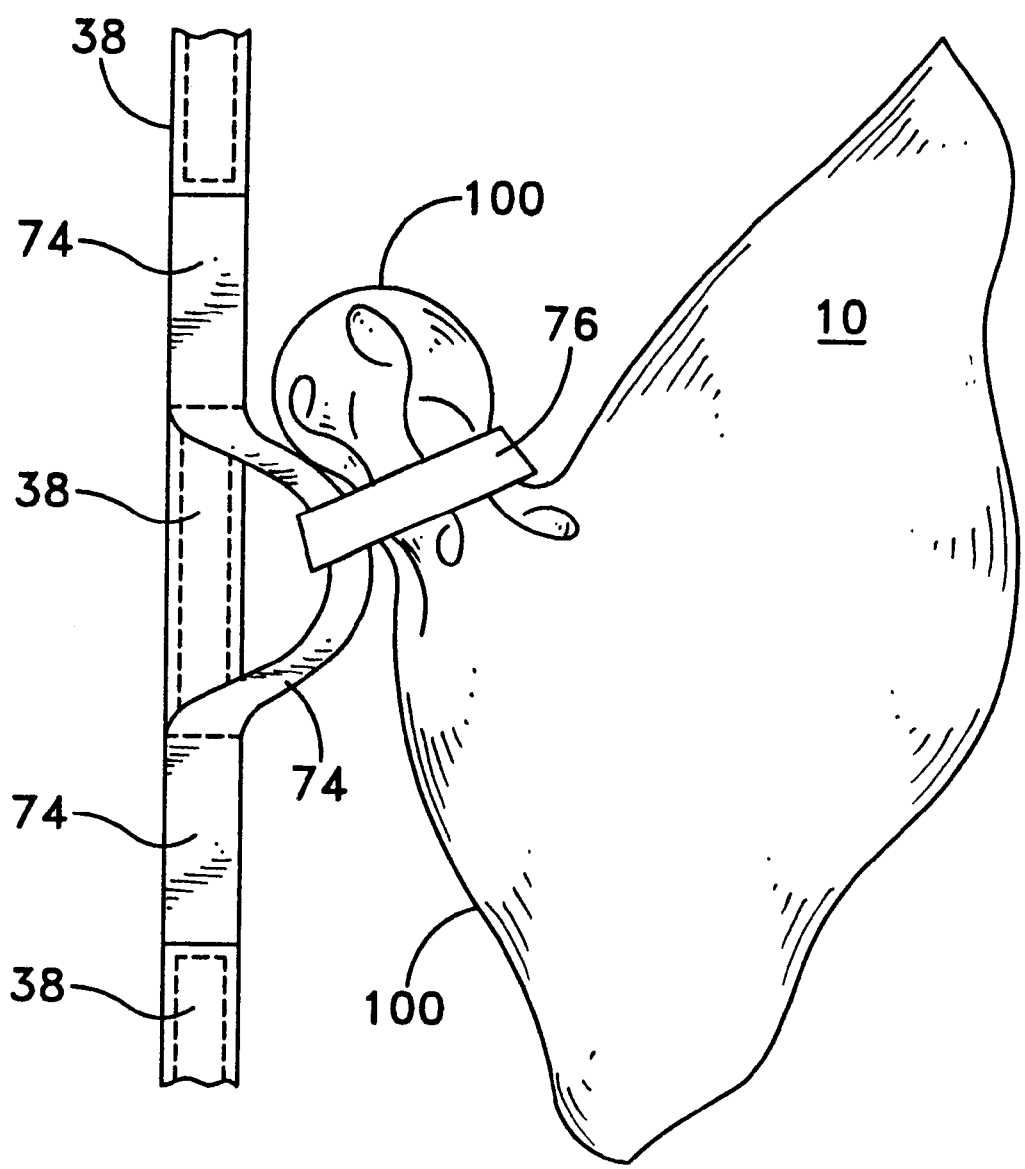
FIG. 3 is a diagrammatic illustration of a portion of the parachute shown in FIGS. 1 and 2.

To assist in proper deployment of the canopy, the sheet 10 is provided with elastic bands 72, 76 (FIG. 1) anchored to the sheet 10 by skirt retaining loops 70, 74; respectively. The skirt retaining loop 70 is sewn onto the reinforcing line 32, and captures the band 72. The skirt retaining loop 74 (FIG. 3) is sewn onto the reinforcing line 38 and captures the band 76. When the canopy is pleated in preparation for packing, pleats extend from points 80, 82, 84, 86, 90, 92, 94 and 96 to the center 98. Hem portions 100 of the pleats formed along hypothetical lines 90–98, 92–98, 94–98 and 96–98 (FIG. 3) are pulled through the expandable band 76. Similarly, hem portions 102 of the pleats formed along hypothetical lines 80–98, 82–98, 84–98 and 86–98 are pulled through the expendable band 72.

The skirt retaining loops 70, 74 control the folded sheet during deployment. The two loops 70, 74 are sewn into their respective reinforcing lines at equal distances from attachment loops 44a, 40a and at 180° from each other. During initial deployment and inflation phases of the parachute opening, interference in the inflation process by skirt material is minimized and opening reliability is substantially enhanced. The aforesaid arrangement reduces filling time, thereby providing excellent low altitude capability and accuracy in drops.

There is thus provided a rough terrain cargo parachute assembly having a minimum number of suspension lines, which opens quickly and reliably, and which deflates quickly upon impact. The parachute is relatively simple to manufacture, and therefore relatively inexpensive. Further, given the simplicity of the parachute design, it is easily packed and is of small pack size and light weight when packed.

It is to be understood that the present invention is by no means limited to the particular construction and method steps herein disclosed and/or shown in the drawings, but also comprises any modification or equivalent within the scope of the claims.

What is claimed is:

1. A rough terrain cargo parachute assembly comprising:
   a canopy defining four tubular sleeves equidistantly disposed on an external surface of said canopy when said canopy is deployed, each of the sleeves having an opening at a hem line of said canopy and being in communication with an interior of said canopy, the canopy hem line, less the sleeves, being substantially round; and
   a suspension line connected to said canopy at each point wherein one of the sleeve openings is adjacent the canopy hem line,
   wherein said canopy comprises a square piece of canopy material with cutouts at each corner thereof to provide eight outwardly extending points, four reinforcing lines, each extending from one of the points to an oppositely disposed point, and a loop disposed at each end of each reinforcing line, the loop being adjacent the hem line of said canopy, and
   wherein two loops, being adjacent at the hem line, are connected to one of said suspension lines.

2. The assembly in accordance with claim 1 wherein said canopy is devoid of vents other than said tubular sleeves.

3. The assembly in accordance with claim 1 wherein four suspension lines are each attached to said canopy adjacent one of the sleeve openings and the canopy hem line.

4. The assembly in accordance with claim 1 wherein said canopy comprises a singular planar surface.

5. A rough terrain cargo parachute assembly comprising:
   a canopy defining four tubular sleeves equidistantly disposed on an external surface of said canopy when said canopy is deployed, each of the sleeves having an opening at a hem line of said canopy and being in communication with an interior of said canopy, the canopy hem line, less the sleeves, being substantially round;
   a suspension line connected to said canopy at each point wherein one of the sleeve openings is adjacent the canopy hem line,
   wherein said canopy comprises a square piece of canopy material with cutouts at each corner thereof to provide eight outwardly extending points, four reinforcing lines, each extending from one of the points to an oppositely disposed point, and a loop disposed at each end of each reinforcing line, the loop being adjacent the hem line of said canopy;
   a first expandable band connected to a first of said reinforcing lines at a first distance from the loop disposed at the end of the first reinforcing line; and
   a second expandable band connected to a second of said reinforcing lines at a distance equal to the first distance, from the loop disposed at the end of the second reinforcing line;
   wherein the first band being disposed 180° from the second band; and
   wherein the bands being adapted to receive and releasable retain skirt portions of said canopy so as to hold the skirt portions in packed condition and release the skirt portions in deployment.

6. The assembly in accordance with claim 5 wherein each of said expandable bands is captured by a retaining loop sewn onto one of said reinforcing lines.

7. A method for making a rough terrain parachute, the method comprising the steps of:
   providing a sheet of parachute material in a square configuration;
   cutting symmetrical two-sided openings into each corner of the sheet to provide eight outwardly extending points in the sheet;
   sewing load-bearing reinforcing lines from each of the points to an opposite point to provide four load-bearing lines extending across the sheet edge-to-edge;
   providing a loop at each end of the reinforcing lines;
   attaching a suspension line to each of two loops, said loops being adjacent at the hem line, thereby to affix four suspension lines to the sheet and to form four sleeves on the sheet, each of the sleeves having an opening at a hem of the sheet and being in communication with an interior of the canopy formed from the sheet when the canopy is deployed;
   connecting a first expandable band to a first of the reinforcing lines at a selected distance from the loop disposed at the end of the first reinforcing line; and
   connecting a second expandable band to a second of the reinforcing lines at the selected distance from the loop disposed at the end of the second reinforcing line;
   wherein the first and second expandable bands being disposed at 180° from each other; and
   wherein the bands being adapted to retain skirt portions of the sheet when the parachute is in packed condition and to release the skirt portions during deployment of the parachute.

\* \* \* \* \*